UNITED STATES PATENT OFFICE.

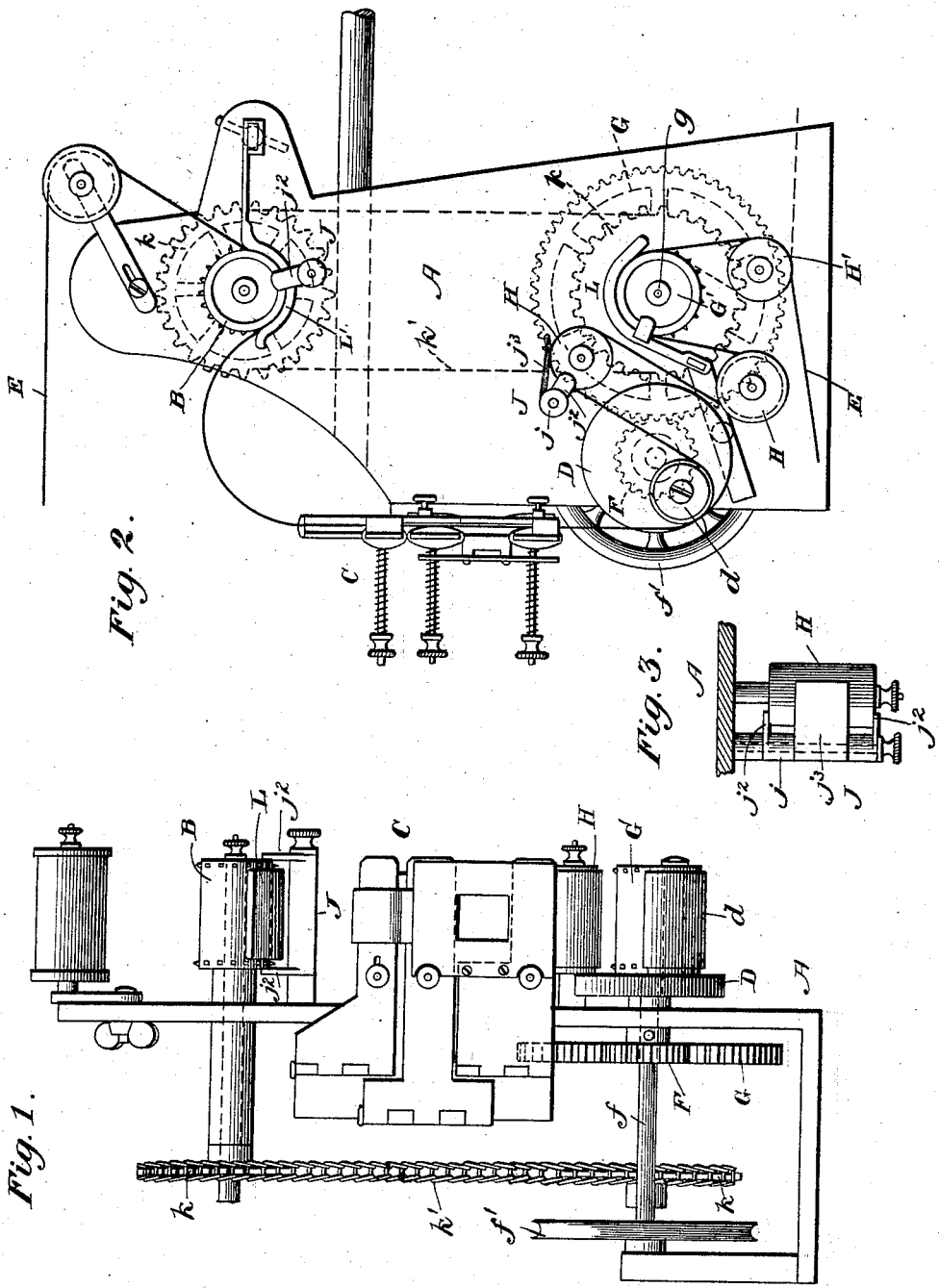

THOMAS ARMAT, OF WASHINGTON, DISTRICT OF COLUMBIA.

VITASCOPE.

SPECIFICATION forming part of Letters Patent No. 580,749, dated April 13, 1897.

Application filed November 25, 1896. Serial No. 613,406. (No model.)

*To all whom it may concern:*

Be it known that I, THOMAS ARMAT, a citizen of the United States, residing at Washington, in the District of Columbia, have invented certain new and useful Improvements in Vitascopes; and I do hereby declare the following to be a full, clear, and exact description of the invention, such as will enable others skilled in the art to which it appertains to make and use the same.

This invention relates to apparatus for exhibiting pictures, but more particularly to that class of picture-exhibiting apparatus disclosed in my pending application, Serial No. 579,901, filed February 19, 1896, in which the impression is given to the eye of objects in motion.

The primary object of the invention is to provide simple and efficient means for imparting motion to the film-operating mechanism, whereby a series of photographic or other pictures showing successively the different positions or attitudes assumed by a person or object in motion may be displayed in such a manner as to reproduce to the eye the appearance of the moving object through all the phases of such movement with a life-like and unblurred effect.

Another object is to provide simple and efficient means for relieving the strain on the film between the tension device and the take-up drum while the film is being intermittently moved, and to prevent the teeth on the take-up drum from enlarging or otherwise injuring the apertures or perforations in the film or strip, whereby the life of the film, as well as its efficiency, is materially enhanced.

Further objects are to provide a simple and efficient guiding device for alining the film and to provide means adapted to be employed in a photographic apparatus.

The invention will be first hereinafter more particularly described and then pointed out in the claims at the end of the description.

Referring to the accompanying drawings, forming a part of this specification, Figure 1 is a front elevation of a portion of the apparatus embodying my invention with the film or strip removed. Fig. 2 is a side elevation of the mechanism shown in Fig. 1 with the film in position, and Fig. 3 is a detail plan view of one of the spools or drums and the guide-fingers for alining the film.

In the drawings, A may designate a suitable frame or support, B a feed-drum, C a tension device, and D a rotating element preferably provided with an eccentrically-arranged roller $d$, adapted to engage the film or strip E at each revolution, so as to intermittently move the film or a portion thereof through the tension device, all of which may be of any preferred form or construction or similarly constructed to that disclosed in my application before referred to or in my pending application, Serial No. 607,058, filed September 26, 1896.

The operation and movement of the film may be such that each successive picture is held a much longer time than is required to remove it and substitute another in its stead, thus prolonging the period of illumination very greatly as compared with the period of interruption or change; and there is no necessity for obstruction of the light by the interposition of a shutter or opaque substance across its path, so that the impression of the picture on the eye is so much longer and more permanent than the distortion or shadow effect incident to its movement, and the interval of change or interruption is so infinitesimal that the image of the picture is readily retained until displacement and substitution take effect; and owing to the inability of the eye to receive an impression from every phase of motion the interruption or change is wholly imperceptible, and the result is a most vivid appearance of an object in motion, otherwise unchanging, clearly exhibiting all the phases of such motion with life-like effect.

I have not illustrated an illuminator and a condensing-lens adapted to concentrate the rays of light upon a picture located in the focus of an objective lens, but this latter, as well as the illuminator and condensing-lens, may be of the usual or of any preferred construction and arranged in any suitable manner.

The film or strip may be composed of any suitable transparent or translucent flexible substance preferably provided with the usual apertures or perforations near its edges, and adapted to provide a surface for carrying pictures produced thereon by photographic or other means, the several pictures in the series representing successively different positions of a moving object, so that the rapid exhibition of the entire series of pictures in the order in which they were made or taken may result in the reproduction of the appearance of the moving object in every phase of its motion. This film may be either an endless or a continuous band or strip supported in any suitable manner and may be arranged and operated so that slack may be provided between the feed-drum B and the tension device in order that the entire film need not be moved, as in my aforesaid applications.

Owing to the usual form and arrangement of the take-up drum and the mechanism for intermittently moving the film, and the high speed necessary for the proper action thereof, it has been necessary to employ more or less complicated speed-reducing mechanism between said take-up drum and the film-operating mechanism, thereby materially increasing the cost of manufacture of the apparatus and causing considerable backlashing and jarring of the parts. To obviate these objectionable features, I secure a gear F to the shaft $f$ of the rotating element D, adapted to mesh with a larger gear G, secured to the shaft $g$, though in some instances a gear or gears adapted to mesh with each other and with the gears F and G may be employed, if desired.

The shaft $f$ is preferably provided with a driving-wheel $f'$ or other means for rotating the same, while the shaft $g$ has the take-up drum G' secured thereto, said drum being preferably provided with teeth or projections adapted to engage the perforations in the film or strip. This take-up drum and its shaft are arranged to rotate relatively to the shaft of the rotating element according to the length of film and the number of pictures thereon moved at each revolution of said shafts. In this instance the rotating element D moves the film or a portion thereof equal to the distance between any two successive pictures, so as to displace one picture and place another in its stead, and the gears F and G and the take-up drum G' are so proportioned that the rotating element makes four revolutions to one revolution of said drum. By this means a small take-up drum may be employed and a simple and direct gear connection made between the driving and the driven or take-up-drum shafts.

For the purpose of relieving the strain on the film and preventing the enlargement of the perforations therein as much as possible I prefer to provide one or more idler drums or spools H, of any suitable material, preferably two, arranged on the support A between the take-up drum G' and the rotating element D. One of the spools H may be arranged above the take-up drum G' and the other below said drum. The film after being arranged to be engaged by the roller of the rotating element is passed around the upper surface of the upper spool, then around the lower surface of the lower spool and around the take-up drum, and from there to either side of an idler roller or spool H'. The upper drum or spool H is preferably provided with a pressure and guiding device J to aline the film and prevent its jumping or buckling at this point while being intermittently moved. This pressure and guiding device may comprise a sleeve $j$, rotatably arranged on a stem projecting outwardly from the support, having fingers $j^2$ thereon adapted to embrace the edges of the drum, so as to aline the film, and with a pressure-plate $j^3$ secured to the sleeve $j'$ and adapted to exert sufficient pressure to retain the film against the drum, though the pressure-plate in some instances may be dispensed with. The pressure-plate $j^3$ is preferably covered with a yielding material, as leather, and is arranged to swing on the stem with the sleeve and guide-fingers $j^2$, so as to permit the film to be readily passed around the drum or spool, both the pressure-plate and the guide-fingers being adapted to be held in an adjusted position by a thumb-nut arranged on the end of the stem or in any other suitable manner.

The feed-drum B and the take-up drum G' are preferably of the same diameter and are adapted to be rotated at the same rate of speed, so that one will take up exactly the same length of film as is fed by the other at each revolution of said drums. The shafts of these drums may each have a sprocket-wheel $k$, around which passes a sprocket-chain $k'$, though other means may be employed for connecting and rotating said shafts.

Each of the drums may be provided with a pressure and guiding device, as at J, or they may have an arm L, provided with guide-fingers adapted to aline the film. I may, however, employ a yielding arm, as L', without the guide-fingers and instead of said guide-fingers use a guiding device, similar to the guiding device J, without the pressure-plate, as shown in connection with the feed-drum.

I thus provide simple and efficient means for imparting motion to the film-operating mechanism and for alining and preventing injury to the film or to the apertures or perforations therein.

The mechanism, either in part or as a whole, when desired, may be employed in connection with a photographic apparatus having the usual or any preferred mechanism for adapting the improvements herein described to such a device.

It is obvious that the shaft $g$ may be employed as the driving-shaft, that a shutter may be employed, if desired, and that some of the parts may be dispensed with or others substituted therefor without departing from the spirit of my invention.

Having thus fully described my invention, what I claim as new, and desire to secure by Letters Patent of the United States, is—

1. In an apparatus of the character described, the combination with a film or strip, of a tension device, a rotating element adapted to cause the film to intermittently move through said tension device, a drum for taking up the film as it is intermittently moved, together with a gear connection between said rotating element and the drum, said gear connection being so proportioned and timed that the interval of exposure of the film shall predominate the interval of motion, whereby simple and efficient mechanism may be provided for operating the film, substantially as described.

2. In an apparatus of the character described, the combination with a film or strip, of a tension device, a shaft provided with a rotating element having an eccentrically-arranged roller thereon adapted to engage the film and intermittently move the same through said tension device, a shaft and a take-up drum secured to said shaft, a gear secured to the shaft of the rotating element, and a second gear of larger diameter secured to the take-up-drum shaft and meshing directly with the gear on the rotating-element shaft, said gear being so proportioned and timed that the interval of exposure of the film shall predominate the interval of motion, whereby simple and efficient mechanism may be provided for operating the film, substantially as described.

3. In a device of the character described, the combination with a film or strip, of a tension device, a feed-drum adapted to be continuously rotated and to provide slack in the film between said drum and the tension device, a take-up drum connected to the feed-drum so as to rotate in unison therewith, a rotating element interposed between the tension device and said take-up drum and adapted to intermittently move a portion of the film at each revolution, together with a direct gear connection between said rotating element and the take-up drum, said gear connection being so proportioned and timed that the interval of exposure of the film shall predominate the interval of motion, whereby simple and efficient mechanism may be provided for operating the film, substantially as described.

4. In an apparatus of the character described, the combination with a film or strip provided with apertures or perforations therein, a rotating element adapted to cause the film to intermittently move through said tension device, a drum provided with teeth engaging the perforations in the film and adapted to take up said film as it is intermittently moved, together with a pair of idler-spools interposed between the take-up drum and the rotating element and arranged above and below said drum on the same side thereof; said film being passed around the upper surface of the upper spool, and then around the lower surface of the lower spool to the take-up drum, whereby the strain on the film by the take-up drum may be relieved and the enlargement of the perforations thereof prevented, substantially as described.

5. In an apparatus of the character described, the combination with a suitable support, of a drum arranged thereon, a film or strip passing around said drum, and fingers arranged at the opposite ends of the drum adapted to aline said film, said fingers being adjustably held upon the support so as to swing away from the drum to permit the film to be passed around the latter, substantially as described.

In testimony whereof I affix my signature in presence of two witnesses.

THOMAS ARMAT.

Witnesses:
J. A. E. CRISWELL,
CHARLES E. RIORDON.